Figure 6:
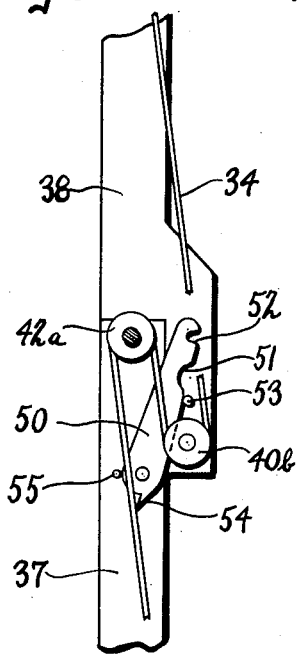

Oct. 23, 1956  R. E. BOGER  2,767,812
EXTENSIBLE STRUCTURE
Filed April 15, 1952  6 Sheets-Sheet 1
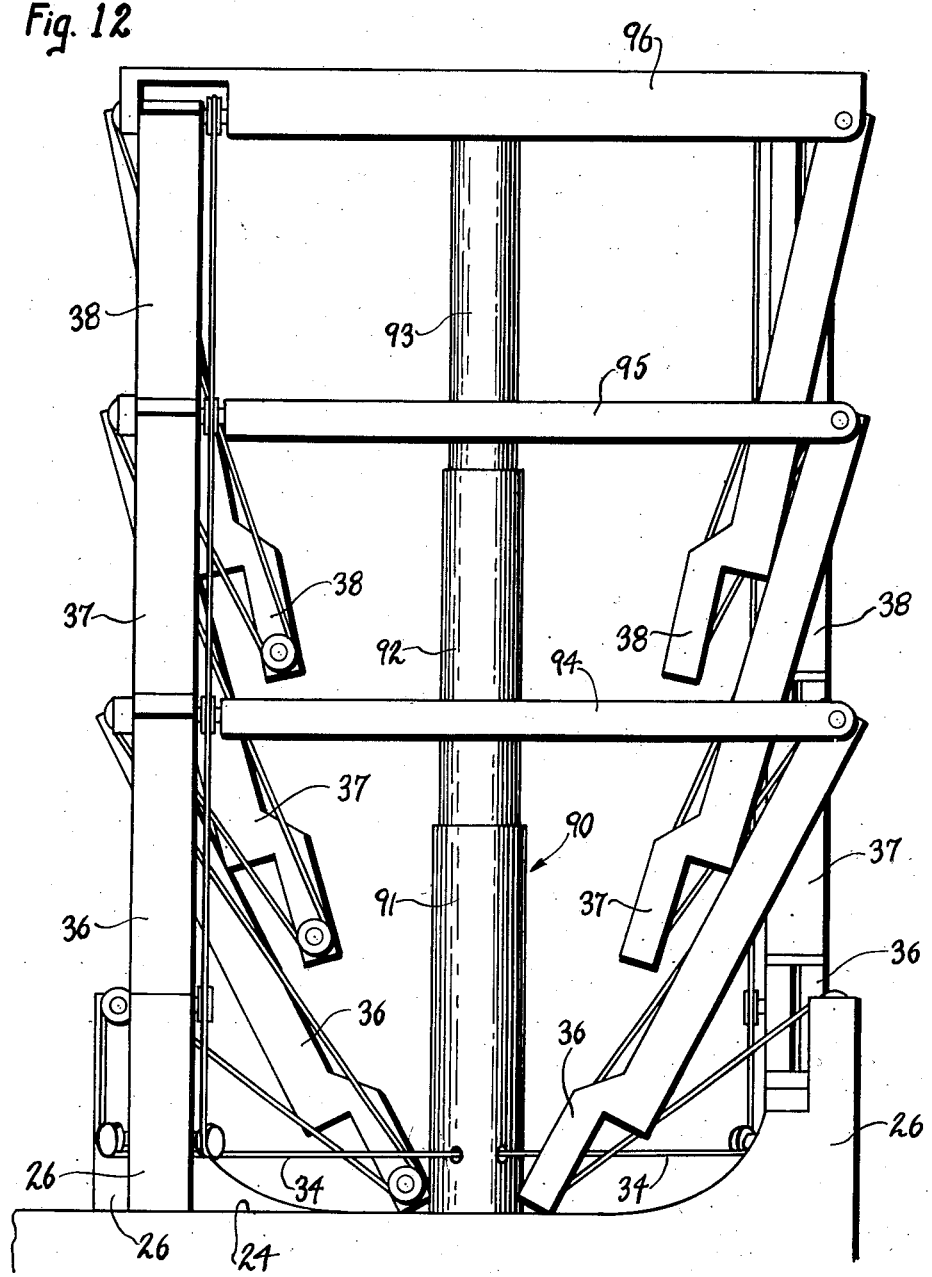
INVENTOR.
RAY E. BOGER
BY
Attorney Oct. 23, 1956   R. E. BOGER   2,767,812
EXTENSIBLE STRUCTURE
Filed April 15, 1952   6 Sheets-Sheet 2
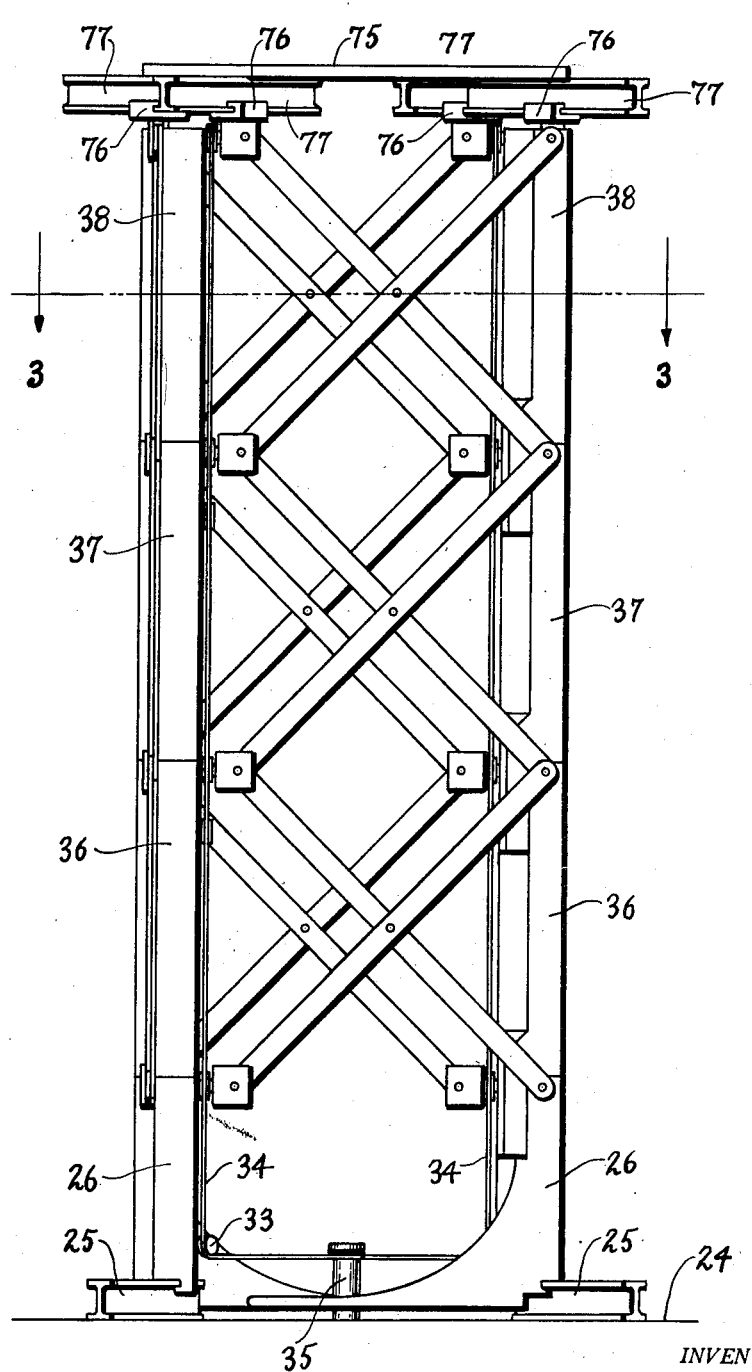
INVENTOR.
RAY E. BOGER
BY
Attorney Oct. 23, 1956 R. E. BOGER 2,767,812
EXTENSIBLE STRUCTURE
Filed April 15, 1952 6 Sheets—Sheet 3
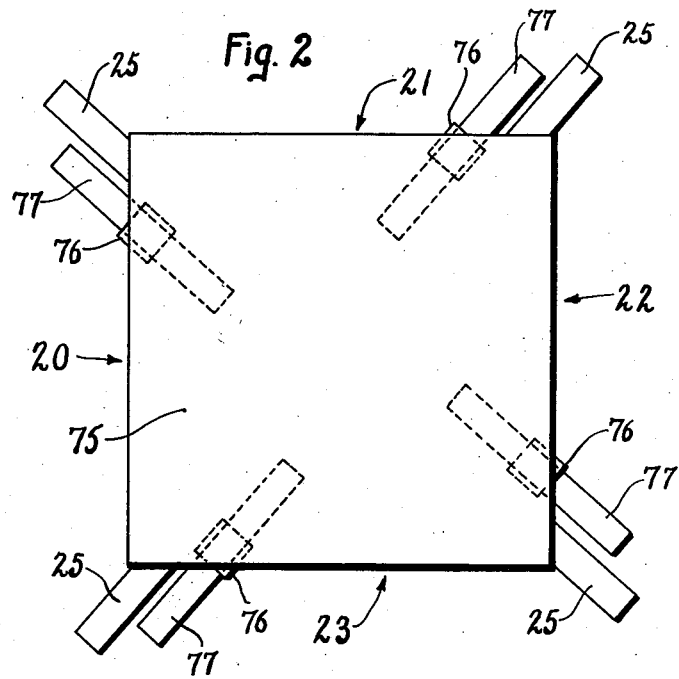
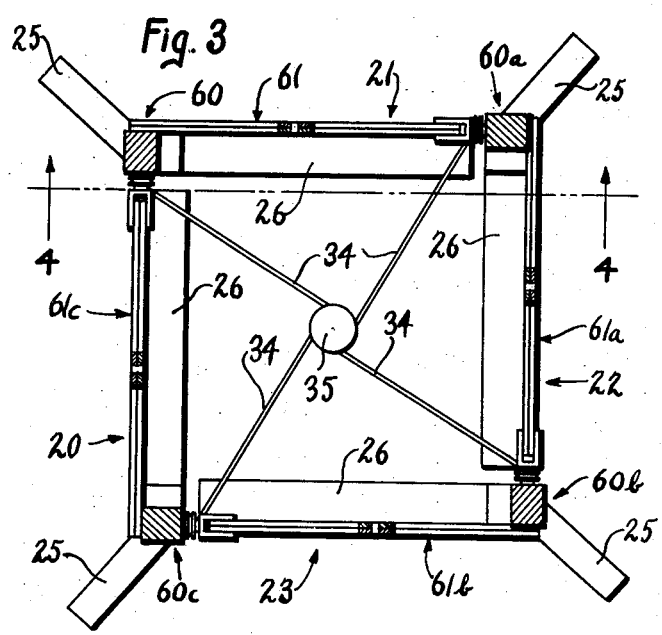
INVENTOR.
RAY E. BOGER
BY
Attorney

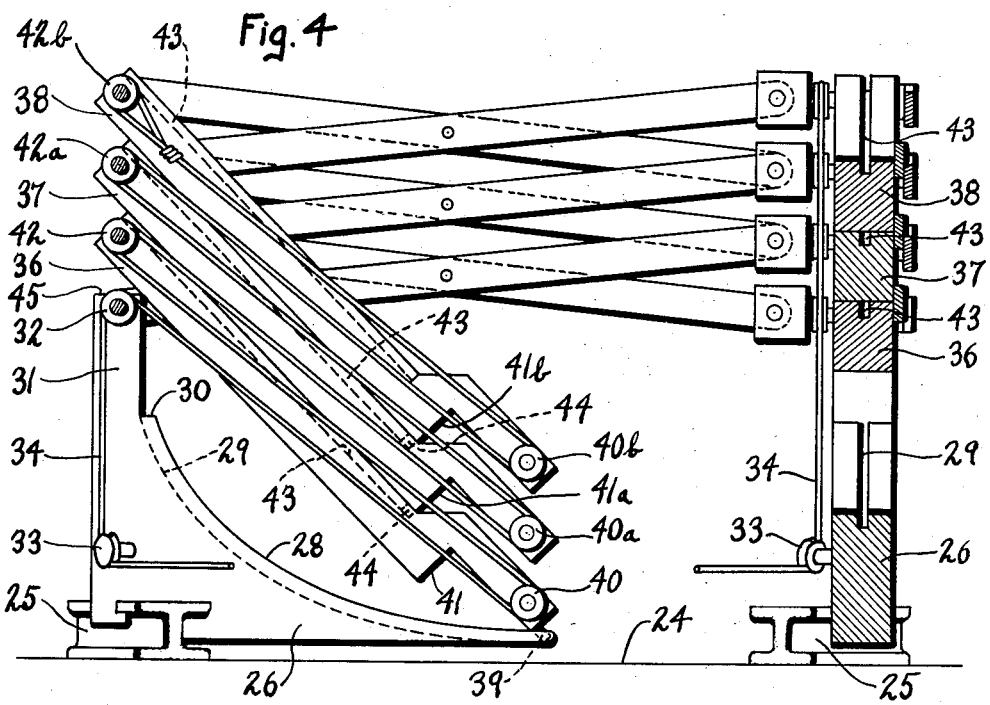

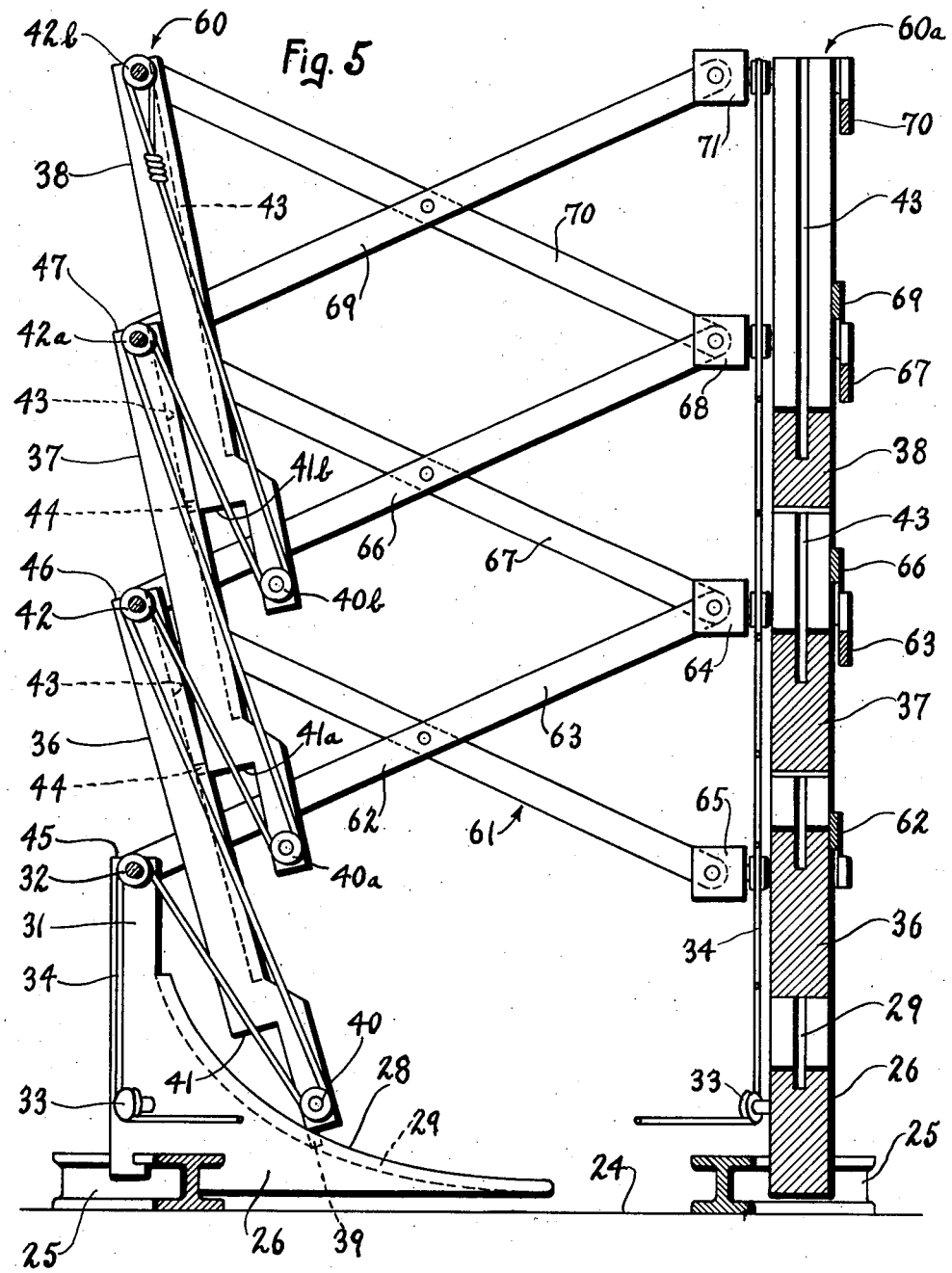

Oct. 23, 1956 — R. E. BOGER — 2,767,812
EXTENSIBLE STRUCTURE
Filed April 15, 1952 — 6 Sheets-Sheet 6

INVENTOR.
RAY E. BOGER
BY
Attorney

United States Patent Office 2,767,812
Patented Oct. 23, 1956

2,767,812

EXTENSIBLE STRUCTURE

Ray E. Boger, Warren, Ohio

Application April 15, 1952, Serial No. 282,430

6 Claims. (Cl. 189—14)

My invention relates to an extensible structure and the principal object of the invention is to provide new and improved structures of this character.

This invention fills a long wanted need for a structure which is compact in its retracted relation, but which is easily and quickly extended, and in extended relation provides a rigid and substantial structure. Extensible structures of the prior art have been largely unsuccessful because such structures were unstable and unreliable in their extended relation, or were heavy and cumbersome and accordingly could not be easily transported and/or extended.

My invention may be used in the many instances wherein it is necessary or desirable to quickly extend a structure and in this connection it may be used for scaffolding, the frame work for a derrick, as an elevator, as a means of bridging spaced-apart places, as an antenna support, and many other uses too numerous to mention.

As before mentioned, a structure of my invention may be easily and quickly moved to extended relation, and when in such relation certain parts of such structure are held generally in compressible alignment, thus providing a frame structure which is as strong, if not stronger, than structures heretofore erected manually and permanently connected in erected relation. My invention also includes means for easily and quickly removing the parts of the structure from compressible alignment to dispose such parts for quick and easy movement to a retracted relation and provide a compact structure which is readily transported.

Figure 7:
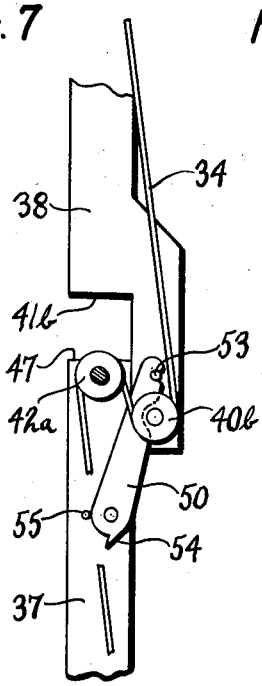
Figure 8:
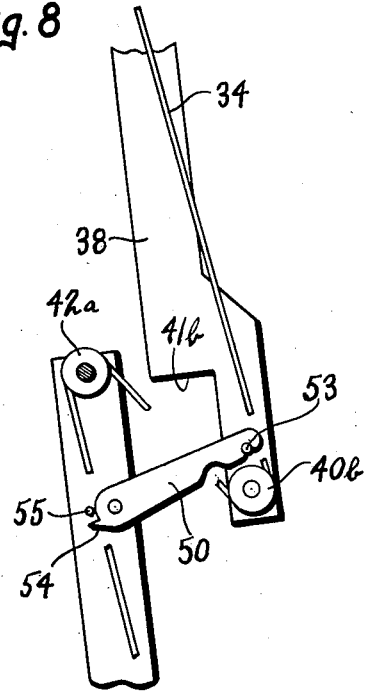
Figure 11:
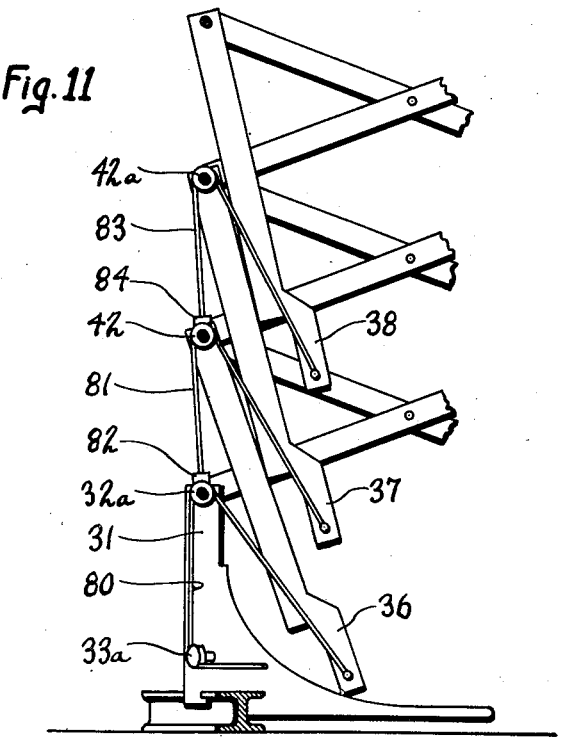
Figure 9:
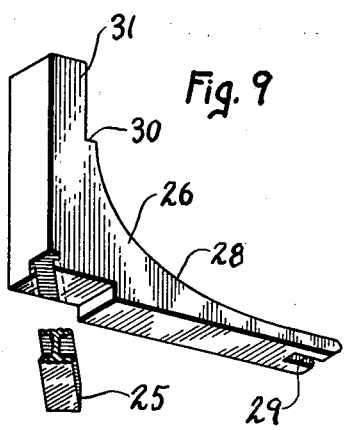

In the drawings accompanying this specification and forming a part of this application, there is shown, for purposes of illustration, embodiments which this invention may assume, and in these drawings:

Figure 1 is a side elevational view of a structure, in extended relation, showing a preferred embodiment of my invention, Figure 2 is a top plan view of the structure shown in Figure 1, Figure 3 is a transverse sectional view corresponding generally to the line 3—3 of Figure 1, Figure 4 is an enlarged fragmentary sectional view corresponding to the line 4—4 of Figure 3, but with the structure in retracted relation, Figure 5 is a view similar to Figure 4 but with the structure partially extended, Figures 6, 7 and 8 are enlarged fragmentary detail views showing operation of mechanism providing for retraction of the structure, Figure 9 is a fragmentary perspective view of a detail of my invention, Figure 10 is a view similar to Figure 4 but showing power applied from the top of the structure, Figure 11 is a fragmentary view similar to Figure 5 but showing a modified means for effecting movement of parts, and Figure 12 is an elevational view along the lines of Figure 5 but showing still another means for effecting movement of parts.

Referring to Figures 1 through 8, the embodiment therein shown comprises a multi-sided structure, herein disclosed for purposes of illustration as a four sided figure, having sides 20, 21, 22 and 23 (see Figures 2 and 3). The sides are preferably identical and accordingly description of one will fit all others.

Referring particularly to Figures 4 and 5, the structure is mounted on a base 24 which may be adapted for movement so that the structure may be moved from one location to another. Mounted on the base, at the four corners of the herein disclosed structure, are rails 25, each of which is directed inwardly toward the center of the structure.

Mounted on each rail 25, for sliding movement longitudinally thereof, is a guide and support 26 having a T slot 27 engageable around the top flange of a respective rail, each support 26 extending at an angle with its respective rail. Each support provides a cam surface 28 which inclines upwardly in a direction toward a respective corner of the structure, the cam surface having a groove 29 throughout its length and terminating in a shoulder 30.

An upstanding portion 31 of each support 26 rotatably carries a pulley 32, and spaced downwardly is another pulley 33. Trained over the pulleys 32—33 is a cable 34, the lower terminal end of which is secured to a drum 35 (see Figure 1). The lower terminal ends of the cables 34 for all sides of the structure are preferably secured to the drum 35 so that rotation of the latter, in one direction, produces a pulling force on all cables 34.

Mounted for cooperation with respective supports 26 is a series of movable members. In the present embodiment, three members 36, 37 and 38 are shown in relation with a respective support 26, although it will be appreciated that the number of members may vary in accordance with requirements.

Each of the members 36, 37 and 38 is of elongated nature and is here shown as generally rectangular in cross-section. The member 36 has its lower end resting on the cam surface 28 when the structure is not fully extended and this lower end is formed with a guide 39 which fits within the groove 29 and thus holds this end of the member against lateral displacement.

A pulley 40 is rotatably carried at the lower end of the member 36 and this lower end is formed as a step to provide a shoulder 41. A pulley 42 is also rotatably carried by the upper end of the member 36.

The members 36, 37 and 38 are substantially identical and parts on members 37 and 38 which correspond to like parts on member 36 will be numbered alike but supplemented with the suffix "a" in the case of member 37 and suffix "b" in the case of member 38.

Members 36, 37 and 38 each have a longitudinal groove 43 formed in its upper surface and members 37 and 38 have guides 44 fitting within respective grooves to hold the lower ends of members 37 and 38 against lateral displacement. The members 36, 37 and 38 of each side of the structure are disposed in juxtaposition, as clearly shown in Figures 4 and 5, and adjoining members are movable longitudinally one relative to the other.

Means are provided to effect longitudinal movement of adjoining members, and in the embodiment disclosed in Figures 1 through 8, such means comprises the cable 34 which passes over the pulley 32, then extends to and around pulley 40 at the lower end of member 36, then extends to and around pulley 42 at the upper end of member 36, then extends to and around pulley 40a at the lower end of member 37, then extends to and around pulley 42a at the upper end of member 37, then extends to and around pulley 40b at the lower end of member 38, and then extends and is fixed to the upper end of member 38. In the present embodiment, the upper terminal of the cable 34 passes around pulley 42b and is secured to itself.

When the drum 35 is rotated in a direction to exert a pulling force on the cable 34, such force causes a shortening of the distance between pulleys 32—40, 42—40a and 42a—40b, whereupon the lower end of the member 36 is caused to move along the cam surface 28 and such movement effects uprighting of the member 36 and the subsequent members 37 and 38. Shortening of the distance between pulleys 42—40a and 42a—40b causes the member 37 to slide longitudinally along the member 36 and the member 38 to slide longitudinally along the member 37 in such manner that the lower ends of the members 37 and 38 approach the upper ends of the members 36 and 37 respectively. Pulling force on the cable 34 also urges adjoining members in a direction toward each other, for a purpose to appear.

As seen in Figure 5, the members 36, 37 and 38 are in process of being elevated and uprighted and in fully extended position the member 36 is urged to shift laterally of the support 26 by the force exerted by the cable, so that its shoulder 41 rests on the top surface 45 of this support as clearly shown in Figure 1. Progressively, the shoulder 41a of member 37 will engage over the top surface 46 of member 36 and the shoulder 41b of member 38 will engage over the top surface 47 of member 37, thus forming corner posts for the structure which are in compressible alignment and accordingly afford all the strength and rigidity of structures which heretofore were laboriously and permanently erected.

Means are provided for removing all of the sets of members from compressible alignment and attention is especially directed to Figures 6, 7 and 8 wherein such means are shown in detail. In these figures only two adjoining members, which may be members 37 and 38 of each side of the structure, are fragmentarily shown.

In Figure 6, the members 37 and 38 are shown in the position they occupy when the structure is fully extended. Pivotally carried by the upper end of each of the members, including the upstanding portion 31 of each support 26, but not including the upper end of the uppermost member, such as in this case the member 38, is a lever 50 having a clearance groove 51 intermediate its ends and a notch 52 at its free end.

The lever 50 is freely swingable and in the position of parts shown in Figure 6 bears against a pin 63 carried by the lower end of the adjoining member. If desired, a suitable spring may be used to urge the lever to swing in a direction for engagement with the pin 53. The lever 50 has a tail 54 which is adapted to engage with a pin 55 positioned adjacent to the lever point to limit movement of the lever for a purpose to be shown.

To remove the members from compressible alignment it is merely necessary to exert pulling force on the cables 34, such as by proper rotation of the drum 35 to effect a separation of adjoining members, as clearly shown in Figure 7. Thus, with respect to Figure 7, the member 38 is elevated so that its shoulder 41b is spaced from the top surface 47 of member 37.

As the members, such as members 37 and 38 are separated to position shown in Figure 7, the pin 53 will seat in notch 52, the groove 51 providing clearance for the shaft of the pulley 40b. Thereafter, pulling force on the cables 34 is terminated and the members are permitted to gravitate to their lower or retracted positions, adjoining members being pushed apart by the levers 50 to clear the shoulder of one from engagement with the upper end of the other.

As seen in Figures 7 and 8, as pulling force on the cables is terminated, the member 38 will be lowered by gravity. However, since pin 53 is seated in the notch 52 of the lever 50, the latter will cause the lower end of member 38 to swing clear of the upper end of member 37, such swinging movement being continued until the tail 54 of lever 50 engages pin 55, whereupon the parts are in position to permit pin 53 to disengage from notch 52.

From the foregoing, it will be clear that a multi-sided structure can be easily elevated and when elevated provides corner posts, each formed of a plurality of members which snap into compressible alignment, thus providing a rigid structure capable of supporting considerable weight. After desired use, the structure may be quickly retracted in a manner hereinbefore described to provide a compact structure which can be easily transported to another field of use.

To impart lateral rigidity to the structure and to tie together the corners of the structure, a lazy-tong construction is used as part of each side of the structure. Referring particularly to Figure 3 of the drawings showing the structure in elevated relation, the four corner posts of the structure are designated by reference numerals 60, 60a, 60b and 60c, each corner post comprising a support 26 and members 36, 37 and 38.

A lazy-tong construction 61 is pivotally connected to the members of corner posts 60 and 60a, and like lazy-tong construction 61a, 61b and 61c are pivotally connected to posts 60a—60b, 60b—60c, and 60c—60, respectively.

Each of the lazy-tong constructions comprises the usual series of pivoted links, and referring particularly to Figure 5, it will be seen that lazy-tong construction 61 which ties together corners 60, 60a comprises three pairs of pivoted links, link 62 being pivotally connected to the upper end of support 26 for corner 60 extending to pivoted relation with its companion link 63 and from there upwardly to a clevis 64 which is pivotally connected to the upper end of member 36 of corner 60a.

The lower end of link 63 is pivotally connected to a clevis 65 which is in turn pivotally connected to the upper end of the support 26 for corner 60a. Carried by the same pivot between link 63 and upper end of member 36 is a link 66 which extends upwardly to pivot connection with its companion link 67 and from there to pivotal connection with a clevis 68 which in turn is pivotally connected to the upper end of member 37 of corner 60a.

Link 67 extends from pivotal connection with clevis 64 to pivotal connection with the upper end of member 37, and from such pivotal connection a link 69 extends upwardly to pivotal connection with its companion link 70 and thereafter to pivotal connection with a clevis 71 which is in turn connected to the upper end of member 38 of corner 60a. Link 70 extends from pivoted connection with clevis 68 to pivotal connection with the upper end of member 38 of corner 60. It will be appreciated that all sides of the structure are similarly connected.

Accordingly, it will be appreciated that the four members 36 and the lazy-tong construction comprising the four sets of links 62—63 form a section of the structure, and other sections are formed by the other members and their corresponding links. To elevate the structure, the sections are moved to extended relation relative to each other and are held in extended relation and in compressible alignment. To retract the structure, a pulling force is exerted on the cables 34 in an amount sufficient to bring all of the levers 50 into operation, and thereafter the sections may be moved to retracted position.

Since the lazy-tong constructions provide a structure which contracts in transverse size as it is elevated and which expands in transverse size as it is retracted, the supports 26 are each mounted on respective rails 25 and slide therealong to accommodate the change in transverse size to the structure (see Figure 9 especially).

A platform 75 may be secured to the upper end of the structure so that it is in position to support a load in any position of the structure. Referring to Figure 1, the platform 75 may be a member spanning the upper end of the structure, and respective corners of such structure may carry gibs 76 which slidably receive respective rails 77 carried from the underside of the platform 75, the rails being directed toward the center of the structure, as are the rails 25, to provide for change in the transverse size of the structure.

In some instances, such for example when the structure is adapted for use as an elevator or the like, it is desirable that control of the structure be located for operation by a person on the platform, and referring particularly to Figure 10, a platform 75a is shown as carrying a motor 78 for effecting rotation of a drum 35a which is in all respects like the drum 35.

In the construction shown in Figure 10, the free ends of the cables 34 are located at the top of the structure and are wound upon the drum 35a to effect extension of the structure. The cables 34 pass around the pulleys of the members 38, 37, 36 just like before, the lower end of each cable being secured to a respective support 26. In Figure 10, the lower end of each cable is shown as passing around the pulley 32 carried by the support 26 and secured to itself as shown at 79. Otherwise, the construction and operation of the invention shown in Figure 10 is similar to that hereinbefore described.

Figure 11 shows a slightly different type of cable arrangement for effecting elevation of the structure and as therein shown a cable 80 passes around pulleys 33a and 32a of a support 26a in a manner as before and the free end of the cable is anchored to the lower end of member 36.

A second cable 81 is anchored to support 26a, as shown at 82 and passes around pulley 42 of support 36 and has its free end anchored to the lower end of member 37. A third cable 83 is anchored to the top of member 37, as shown at 84 and passes around pulley 42a at the top of member 37 and has its free end anchored to the lower end of member 38. A pulling force on cable 80, such as caused when it is wound on a drum similar to drum 35, will effect extension of the structure. It will be appreciated that power may be applied from the top, as in Figure 10, by suitably changing the cables 80, 81 and 83 to meet the requirements.

In some instances lateral expansion and contraction of the structure, as it is respectively retracted or elevated, is undesirable and attention is directed to Figure 12 of the drawings wherein a multi-sided structure, like that hereinbefore described, is provided without use of lazy-tong constructions.

The members 36, 37 and 38 of each of the sides of the structure are similar to and are connected in like manner as those previously described. In this embodiment a center post 90 is provided, this post being formed of three telescoping sections 91, 92 and 93. Cross-members 94 are here used to tie together the tops of the members 36 and cross-members 95 are used to tie together the tops of members 37. A platform 96 provides, at its sides, a tie for the tops of members 38. The cross-members 94, 95 and platform 96 in combination with the post 90 provide lateral stability to the structure. The post section 91 may house the drum 35 which is adapted to establish a pulling force on the cables 34. Since there is no lateral expansion and contraction of the structure shown in Figure 12, the supports 26 may be immovably secured to the base of the structure.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

1. An extensible structure adapted to be extended to provide an upright structure, comprising a base, a plurality of members in juxtaposed relation and disposed at an angle to the vertical, adjoining members being longitudinally movable, one relative to the other, slidably interengaging means in part carried by said base and in part carried by the lowermost member, adapted to upright said lowermost member, and cable means extending between said base and the lower end of said lowermost member, and between opposite ends of adjoining members whereby force applied to said cable means effects uprighting of said lower member and also effects relative longitudinal movement of said members whereby opposite ends of the same move toward each other and thereby effect extension of said structure.

2. An extensible structure adapted to be extended to provide an upright structure, comprising a base having upwardly inclined cam surface means, a plurality of extensible-retractable members, in retracted relation overlying each other and disposed at an angle to the vertical and grouped adjacent to said base to provide a compact structure, adjoining members being longitudinally slidable, one on the other, and the lowermost of said members having a portion engaging said cam surface means, and cable means extending between said base and the lower end of said lowermost member, and between opposite ends of adjoining members, whereby force applied to said cable means effects uprighting of said lowermost member through cam action and consequential uprighting of the other members, and also effects relative sliding movement of adjoining members whereby opposite ends of the same move toward each other and thereby effect extension of said structure to upright relation.

3. An extensible structure adapted to be extended to provide an upright structure, comprising a base having upwardly inclined cam surface means, a plurality of extensible-retractable members, in retracted relation overlying each other and disposed at an angle to the vertical and grouped adjacent to said base to provide a compact structure, adjoining members being longitudinally slidable, one on the other, and the lowermost of said members having a portion engaging said cam surface means, pulley means on said base adjacent to the upper part of said cam surface means and pulley means at the ends of each of said members, and cable means extending over the pulley means on said base, around the pulley means at the lower end of said lowermost member, around the pulley means at the upper end of said lowermost member, around the pulley means at the lower end of an adjoining member, around the pulley means at the upper end of said adjoining member, and continuing around the pulley means of the remaining members in like fashion, said cable means being fixed to the upper end of the uppermost member, whereby a pulling force on said cable means at its end extending from said base effects uprighting of said lowermost member through cam action and consequential uprighting of the other members, and also effects relative sliding movement of adjoining members whereby opposite ends of the same move toward each other and thereby effect extension of said structure to upright relation.

4. An extensible structure, comprising at least two arms pivoted together in scissors relation, the adjacent arm portions on one side of the pivot being adapted to be separated or contracted to respectively effect extension and contraction of said structure, a lever arm having one end pivoted to one of said arm portions for swinging movement transversely of the line of extension and contraction of said structure, and cable means extending from the pivot of said lever arm around a point on said lever arm spaced from such pivot and over a point on the other of said adjacent arm portions and having an extending cable portion adapted to receive a pulling force which provides for shortening of that portion of the cable between the pivot of said lever arm and the point on the other of said adjacent arms to effect separation of said adjacent arm portions.

5. An extensible structure, comprising a base, a plurality of members extendable from and retractable to said base, said members being in superposed relation in retracted position with at least the lowermost member disposed at an angle to the line of extension, adjoining ones of said members being movable longitudinally relative to each other, interengaging guide means in part on said base and in part on said lowermost member adapted to guide the latter in movement from its retracted position to an extended position wherein its longitudinal axis is moved toward the line of extension, and cable means having a portion extending between said base and an adjacent end of said lowermost member and therefrom between opposite ends of adjoining members, whereby a pulling force applied to said cable means tends to shorten said extending portion of said cable means and thereby move said lowermost member to its extended position and further longitudinally move said adjoining members relative to each other in a direction tending to longitudinally remove them from superposed relation.

6. An extensible structure, comprising a base, a plurality of members extendable from and retractable to said base, said members being in superposed relation in retracted position with at least the lowermost member disposed at an angle to the line of extension, adjoining ones of said members being movable longitudinally relative to each other, interengaging guide means in part on said base and in part on said lowermost member adapted to guide the latter in movement from its retracted position to an extended position wherein its longitudinal axis is moved toward the line of extension, lazy tong link means connected to said base and said members for restricting movement of said members to a predetermined pattern, and cable means having a portion extending between said base and an adjacent end of said lowermost member and therefrom between opposite ends of adjoining members, whereby a pulling force applied to said cable means tends to shorten said extending portion of said cable means and thereby move said lowermost member to its extended position and further longitudinally move said adjoining members relative to each other in a direction tending to longitudinally remove them from superposed relation.

References Cited in the file of this patent

UNITED STATES PATENTS

| | | |
|---|---|---|
| 59,666 | Slater | Nov. 13, 1866 |
| 80,445 | Brand | July 28, 1868 |
| 226,101 | Pfautz | Mar. 30, 1880 |
| 522,252 | Garrison | July 3, 1894 |
| 524,476 | Austin | Aug. 14, 1894 |
| 1,261,633 | Shuford | Apr. 2, 1918 |
| 2,625,443 | Sensenbaugh | Jan. 13, 1953 |

FOREIGN PATENTS

| | | |
|---|---|---|
| 625,029 | France | Apr. 16, 1927 |
| 498,153 | Great Britain | Jan. 4, 1939 |